United States Patent
Li

(10) Patent No.: US 9,176,705 B2
(45) Date of Patent: Nov. 3, 2015

(54) UPLINK TRANSMISSION DEVICE AND METHOD FOR AUDIO SIGNAL VIA AUDIO INTERFACE

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 14/408,358

(22) PCT Filed: Jun. 14, 2013

(86) PCT No.: PCT/CN2013/077224
§ 371 (c)(1),
(2) Date: Dec. 16, 2014

(87) PCT Pub. No.: WO2013/185628
PCT Pub. Date: Dec. 19, 2013

(65) Prior Publication Data
US 2015/0178039 A1    Jun. 25, 2015

(30) Foreign Application Priority Data
Jun. 16, 2012  (CN) .......................... 2012 1 0204170

(51) Int. Cl.
*G06F 17/00* (2006.01)
*G06F 3/16* (2006.01)
*H04R 3/00* (2006.01)
(Continued)

(52) U.S. Cl.
CPC *G06F 3/162* (2013.01); *H04B 1/16* (2013.01); *H04B 1/40* (2013.01); *H04R 3/00* (2013.01)

(58) Field of Classification Search
CPC ............ G06F 13/4086; H04R 2420/09; H04R 29/001; H04R 3/00; H04R 5/04
See application file for complete search history.

(56) References Cited

U.S. PATENT DOCUMENTS

| 6,681,020 B1 * | 1/2004 | Papopoulos | H04R 3/00 381/111 |
| 2003/0200346 A1 * | 10/2003 | Amirtharajah | G06F 13/4086 709/253 |
| 2005/0123144 A1 * | 6/2005 | Wallace | H04R 29/001 381/56 |

(Continued)

FOREIGN PATENT DOCUMENTS

| CN | 1663119 | 8/2005 |
| CN | 101534467 | 9/2009 |

(Continued)

OTHER PUBLICATIONS

WIPO, International Search Report for PCT/CN2013/077224, Sep. 19, 2013.

*Primary Examiner* — Andrew C Flanders
(74) *Attorney, Agent, or Firm* — Hodgson Russ LLP

(57) ABSTRACT

Uplink transmission device and method for an audio signal via an audio interface are provided. In the device, a first pin of the audio interface is connected to a signal output terminal of an uplink audio signal generating device via a first circuit, and a second pin of the audio interface is connected to the signal output terminal of the uplink audio signal generating device via a second circuit. The first pin of the audio interface is one of a microphone pin and a ground pin, and the second pin of the audio interface is the other one of the microphone pin and the ground pin. The first circuit and the second circuit are attenuation circuits for each other.

8 Claims, 3 Drawing Sheets

(51) Int. Cl.
*H04B 1/16* (2006.01)
*H04B 1/40* (2015.01)

(56) References Cited

U.S. PATENT DOCUMENTS

2009/0028350 A1    1/2009  Kim
2009/0232335 A1*   9/2009  Kondo .................... H04R 1/04
                                                          381/174
2014/0198928 A1*   7/2014  Li ........................... H04R 3/00
                                                          381/74

FOREIGN PATENT DOCUMENTS

| CN | 102201827 | 9/2011 |
| CN | 102740188 | 10/2012 |
| CN | 202721806 | 2/2013 |
| JP | 2009224839 | 10/2009 |

* cited by examiner

UPLINK TRANSMISSION DEVICE AND METHOD FOR AUDIO SIGNAL VIA AUDIO INTERFACE

FIELD

The present disclosure relates to an electronic technique field, and more particularly relates to an uplink transmission device for an audio signal via an audio interface, and an uplink transmission method for an audio signal via an audio interface.

BACKGROUND

An existing audio interface generally includes an audio output pin AUDIO, a ground pin GND and a microphone pin MIC. The audio output pin AUDIO generally includes a left-channel pin and/or a right-channel pin which normally are a third pin and a fourth pin of a four-section audio interface. There are two types of line sequences between a first pin and a second pin of the audio interface. As one type, the first pin is the microphone pin MIC, and the second pin is the ground pin GND. As the other type, the first pin is the ground pin GND, and the second pin is the microphone pin MIC.

When the audio interface is transmitting data, downlink audio signals are transmitted by an audio output pin AUDIO which may be one or both of the left-channel pin and the right-channel pin, while uplink audio signals are transmitted by the microphone pin MIC.

If not measured, a line sequence of the first pin and the second pin of an existing audio interface is unknown. Therefore, when transmitting an uplink audio signal, the line sequence of the first pin and the second pin of the audio interface needs to be measured so as to obtain the microphone pin MIC for transmitting the uplink audio signal. Measuring the line sequence of the first pin and the second pin of the audio interface requires extra works and is not convenient.

Thus, a device that ensures transmission of an uplink audio signal in case the line sequence of the audio interface is unknown is required.

SUMMARY

The present disclosure seeks to solve at least one of the above problems.

Accordingly, an objective of the present disclosure is to provide an uplink transmission device for an audio signal.

Another objective of the present disclosure is to provide an uplink transmission method for an audio signal via an audio interface.

In order to achieve the above objectives, embodiments of a first aspect of the present disclosure provide an uplink transmission device for an audio signal via an audio interface. A first pin of the audio interface is connected to an uplink audio signal generating device via a first circuit; a second pin of the audio interface is connected to the uplink audio signal generating device via a second circuit; and the first circuit and the second circuit are attenuation circuits for each other.

Moreover, the first pin of the audio interface is one of a microphone pin and a ground pin, and the second pin of the audio interface is the other one of the microphone pin and the ground pin.

Moreover, the first circuit is a filter circuit or a voltage-dividing circuit, and the second circuit is a filter circuit or a voltage-dividing circuit.

Moreover, the first circuit and the second circuit are symmetric attenuation circuits for each other.

Moreover, the first circuit and the second circuit are asymmetric attenuation circuits for each other.

Embodiments of a second aspect of the present disclosure provide an uplink transmission method for an audio signal via an audio interface. The method comprises: connecting a first pin of the audio interface to an uplink audio signal generating device via a first circuit; and connecting a second pin of the audio interface to the uplink audio signal generating device via a second circuit, where the first circuit and the second circuit are attenuation circuits for each other.

Moreover, the first pin of the audio interface is one of a microphone pin and a ground pin, and the second pin of the audio interface is the other one of the microphone pin and the ground pin.

Moreover, the first circuit is a filter circuit or a voltage-dividing circuit, and the second circuit is a filter circuit or a voltage-dividing circuit.

Moreover, the first circuit and the second circuit are symmetric attenuation circuits for each other.

Moreover, the first circuit and the second circuit are asymmetric attenuation circuits for each other.

With the uplink transmission device for an audio signal via an audio interface and the uplink transmission method for an audio signal via an audio interface according to embodiments of the present disclosure, by connecting the first pin and the second pin of the audio interface to the uplink audio signal generating device in a mutual attenuation manner, an amplitude of the uplink audio signal may be decreased, such that both of the first pin and the second pin of the audio interface may receive the uplink audio signal sent by the uplink audio signal generating device, thus implementing the objective of transmitting the uplink audio signal in a case that a line sequence of the first pin and the second pin of the audio interface is unknown.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
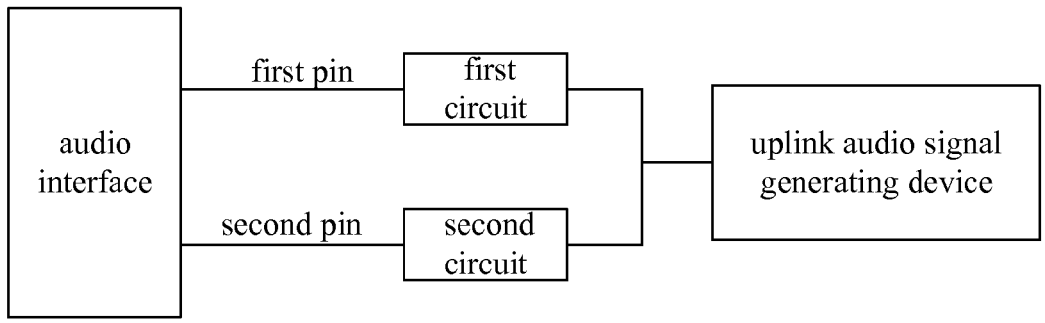
FIG. 1 is a first schematic view of an uplink transmission device for an audio signal via an audio interface according to a first embodiment of the present disclosure.

Reference will be made in detail to embodiments of the present disclosure, where the same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the description of the present disclosure, it should be understood that, terms such as "first" and "second" are used herein for purposes of description, and are not intended to represent or indicate relative importance or significance or to represent or indicate numbers or locations. Furthermore, terms such as "first pin" and "second pin" are used to distinguish the pins, and are not used to limit locations of the pins.

In the description of the present disclosure, it should be understood that, unless specified or limited otherwise, terms such as "connected" and "coupled" should be understood broadly, and may be, for example, fixed connections, detachable connections, or integral connections; or may be mechanical or electrical connections; or may be direct connections or indirect connections via intervening structures, which can be understood by those skilled in the art according to specific situations. Moreover, in the description of the present invention, unless specified otherwise, "a plurality of" means two or more than two.

Any process or method described in a flow chart or described herein in other ways may be understood to include one or more modules, segments or portions of codes of executable instructions for achieving specific logical functions or steps in the process. Although the flow chart shows a specific order of execution, it is understood that the order of execution may differ from what is depicted. For example, the order of execution of two or more boxes may be scrambled relative to the order shown.

In the following, an uplink transmission device for an audio signal via an audio interface and an uplink transmission method for an audio signal via an audio interface according to embodiments of the present disclosure will be described in detail with reference to drawings.

Embodiment 1

FIG. 1 is a schematic view of an uplink transmission device for an audio signal via an audio interface according to embodiments of the present disclosure. As shown in FIG. 1, the uplink transmission device for an audio signal via an audio interface comprises an audio interface, a first circuit, and a second circuit.

The audio interface transmits an uplink audio signal sent by an uplink audio signal generating device via a microphone pin MIC.

A line sequence of the microphone pin MIC and the ground pin GND of the audio interface is unknown. In other words, a first pin of the audio interface is one of the microphone pin MIC and the ground pin GND, and a second pin of the audio interface is the other one of the microphone pin MIC and the ground pin GND.

The first pin of the audio interface is connected to the uplink audio signal generating device via the first circuit, and the second pin of the audio interface is connected to the uplink audio signal generating device via the second circuit.

The first circuit and the second circuit are attenuation circuits for each other.

Moreover, to ensure that the uplink audio signal generating device can transmit an uplink audio signal normally, it is required that the first pin or the second pin of the audio interface form a loop with the uplink audio signal generating device.

Figure 2:
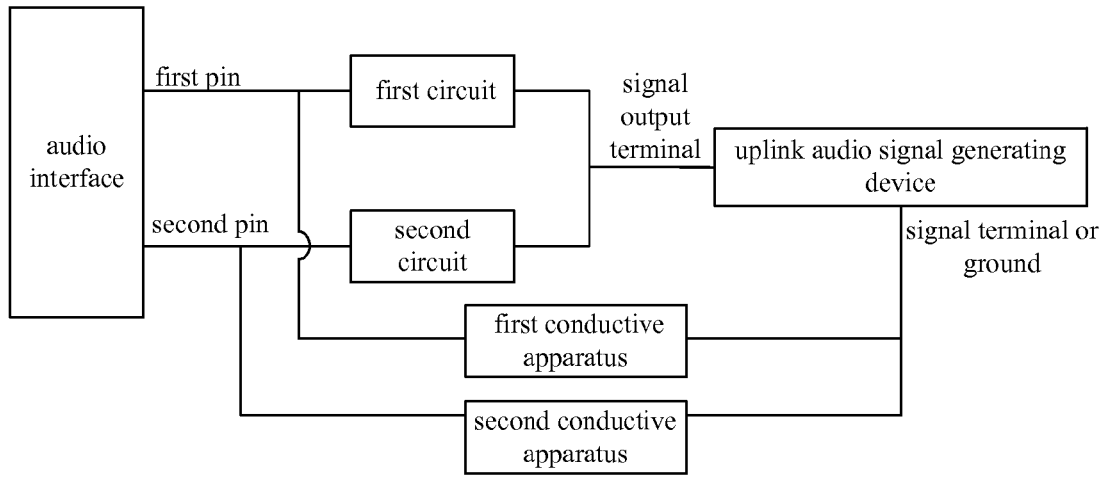
FIG. 2 is a second schematic view of the uplink transmission device for an audio signal via an audio interface according to a first embodiment of the present disclosure.

Specifically, as shown in FIG. 2, the first pin of the audio interface is connected to a signal terminal or a ground terminal of the uplink audio signal generating device via a first conductive apparatus, and the second pin of the audio interface is connected to the signal terminal or the ground terminal of the uplink audio signal generating device via a second conductive apparatus, where the first conductive apparatus is different from the second conductive apparatus.

In the present embodiment, the other terminal of the uplink audio signal generating device is used as a reference level of a signal output terminal of the audio interface. The other terminal of the uplink audio signal generating device comprises one of the signal terminal and the ground terminal When the uplink audio signal generating device is sending an uplink audio signal, the first pin or the second pin is connected to the uplink audio signal generating device via a third pin and a loop is formed, thus ensuring the transmission of the uplink audio signal.

Figure 3:
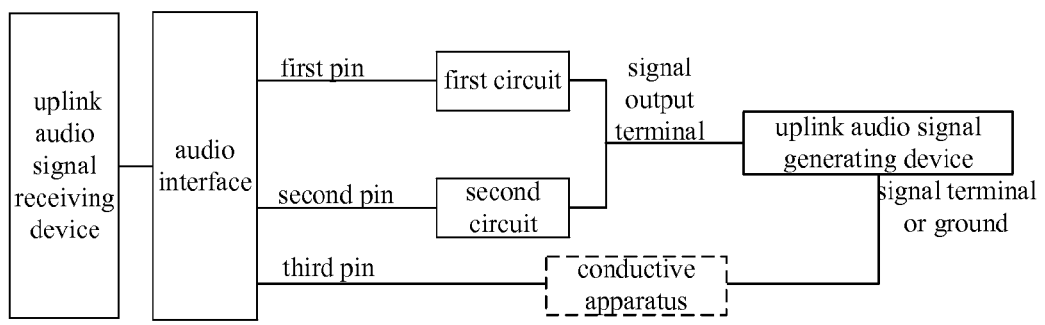
FIG. 3 is a third schematic view of the uplink transmission device for an audio signal via an audio interface according to a first embodiment of the present disclosure.

Specifically, as shown in FIG. 3, the audio interface is connected to an uplink audio signal receiving device, and the third pin of the audio interface is used as a reference level of the first pin and/or the second pin of the audio interface in the present embodiment.

In the present embodiment, the other terminal of the uplink audio signal generating device is used as the reference level of the signal output terminal of the audio interface. The other terminal of the uplink audio signal generating device may include the signal terminal or the ground terminal When the uplink audio signal generating device is sending an uplink audio signal, the first pin or the second pin is connected to the uplink audio signal generating device via the third pin and a loop is formed, thus ensuring the transmission of the uplink audio signal.

Of course, the above two embodiments are among embodiments of the present disclosure, but the present disclosure is not limited to the above two embodiments, provided the first pin or the second pin of the audio interface forms a loop with the uplink audio signal generating device.

Figure 4:
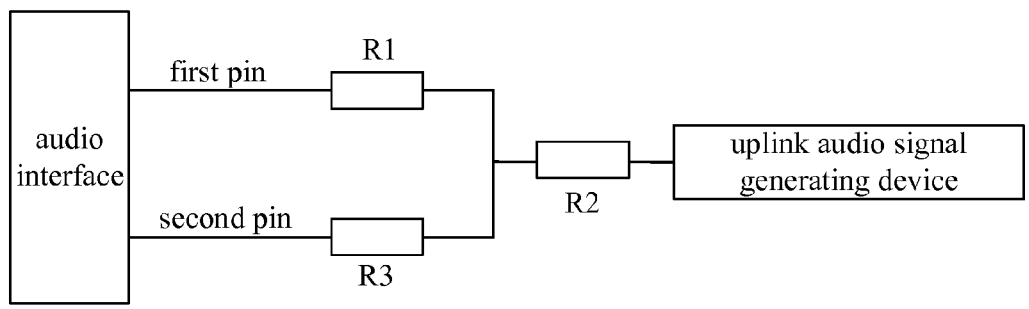
FIG. 4 is a fourth schematic view of the uplink transmission device for an audio signal via an audio interface according to a first embodiment of the present disclosure.

The attenuation circuit may be a voltage-dividing circuit in FIG. 4. As shown in FIG. 4, the first pin of the audio interface is connected to the uplink audio signal generating device via a first resistor R1 and a second resistor R2, and the second pin of the audio interface is connected to the uplink audio signal generating device via a third resistor R3 and the second resistor R2.

When the first pin is the microphone pin MIC and the second pin is the ground pin GND, since a voltage of a DC uplink audio signal sent by the uplink audio signal generating device is divided by the first resistor R1 and the second resistor R2, an amplitude of the uplink audio signal sent by the uplink audio signal generating device is decreased, thus ensuring that the uplink audio signal may be sent to the first pin, namely the microphone pin MIC. In this way, the uplink transmission of the audio signal may be implemented.

When the first pin is the ground pin GND and the second pin is the microphone pin MIC, since a voltage of a DC uplink audio signal sent by the uplink audio signal generating device is divided by the third resistor R3 and the second resistor R2, an amplitude of the uplink audio signal sent by the uplink audio signal generating device is decreased, thus ensuring that the uplink audio signal may be sent to the second pin, namely the microphone pin MIC. In this way, the uplink transmission of the audio signal may be implemented.

Therefore, no matter which line sequence the first pin and the second pin of the audio interface have, the uplink transmission of the audio signal may be implemented via the attenuation circuit according to embodiments of the present disclosure.

Figure 5:
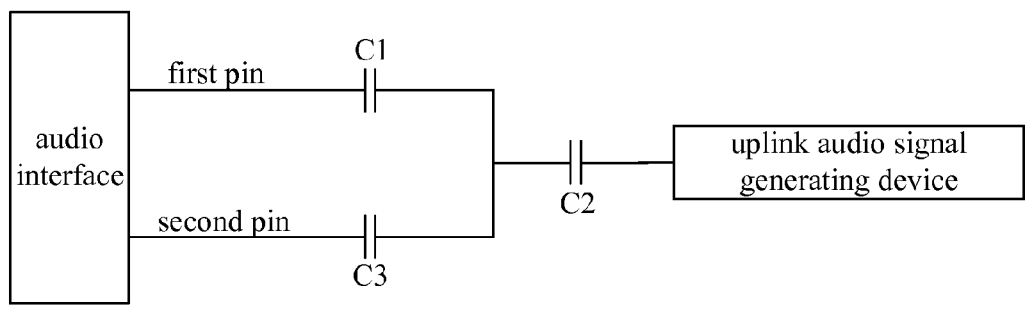
FIG. 5 is a fifth schematic view of the uplink transmission device for an audio signal via an audio interface according to a first embodiment of the present disclosure.

The attenuation circuit may be a voltage-dividing circuit in FIG. 5. As shown in FIG. 5, the first pin of the audio interface is connected to the uplink audio signal generating device via a first capacitor C1 and a second capacitor C2, and the second pin of the audio interface is connected to the uplink audio signal generating device via a third capacitor C3 and the second capacitor C2.

When the first pin is the microphone pin MIC and the second pin is the ground pin GND, since a voltage of an AC uplink audio signal sent by the uplink audio signal generating device is divided by the first capacitor C1 and the second capacitor C2, an amplitude of the uplink audio signal sent by the uplink audio signal generating device is decreased, thus ensuring that the uplink audio signal may be sent to the first pin, namely the microphone pin MIC. In this way, the uplink transmission of the audio signal may be implemented.

When the first pin is the ground pin GND and the second pin is the microphone pin MIC, since a voltage of an AC uplink audio signal sent by the uplink audio signal generating device is divided by the third capacitor C3 and the second capacitor C2, an amplitude of the uplink audio signal sent by the uplink audio signal generating device is decreased, thus ensuring that the uplink audio signal may be sent to the second pin, namely the microphone pin MIC. In this way, the uplink transmission of the audio signal may be implemented.

Therefore, no matter which line sequence the first pin and the second pin of the audio interface have, the uplink transmission of the audio signal may be implemented via the attenuation circuit according to embodiments of the present disclosure.

The voltage-dividing circuit according to embodiments of the present disclosure may be symmetric, in other words, resistances of the first resistor R1 and the third resistor R3 are the same, and capacitances of the first capacitor C1 and the third capacitor C3 are the same. The voltage-dividing circuit according to embodiments of the present invention may be asymmetric, in other words, resistances of the first resistor R1 and the third resistor R3 are different from each other, and capacitances of the first capacitor C1 and the third capacitor C3 are different from each other.

Of course, the voltage-dividing circuit according to embodiments of the present disclosure is not limited to a circuit comprising the resistor and the capacitor as described in the present embodiment. Any symmetric circuit or asymmetric circuit capable of reaching the aim of attenuation is within the scope of the present disclosure.

Embodiment 2

The difference between the present embodiment and Embodiment 1 includes using a filter circuit as the attenuation circuit.

Figure 6:
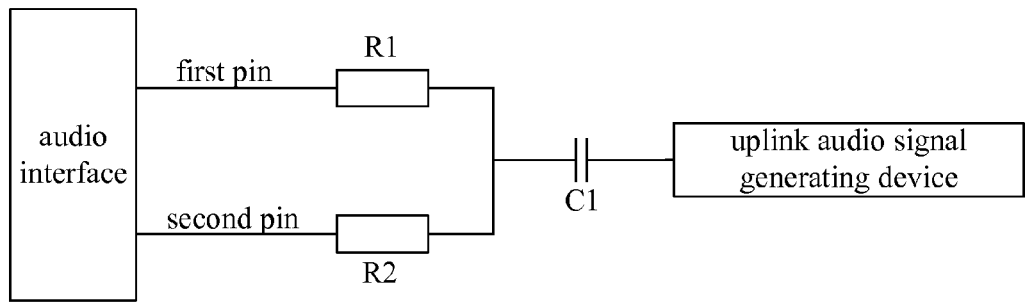
FIG. 6 is a first schematic view of an uplink transmission device for an audio signal via an audio interface according to a second embodiment of the present disclosure.

The attenuation circuit may be a filter circuit in FIG. 6. As shown in FIG. 6, the first pin of the audio interface is connected to the uplink audio signal generating device via a first resistor R1 and a first capacitor C1, and the second pin of the audio interface is connected to the uplink audio signal generating device via a second resistor R2 and the first capacitor C1.

When the first pin is the microphone pin MIC and the second pin is the ground pin GND, since the uplink audio signal sent by the uplink audio signal generating device is filtered by the first resistor R1 and the first capacitor C1, an amplitude of the uplink audio signal sent by the uplink audio signal generating device is decreased, thus ensuring that the uplink audio signal may be sent to the first pin, namely the microphone pin MIC. In this way, the uplink transmission of the audio signal may be implemented.

When the first pin is the ground pin GND and the second pin is the microphone pin MIC, since the uplink audio signal sent by the uplink audio signal generating device is filtered by the second resistor R2 and the first capacitor C1, an amplitude of the uplink audio signal sent by the uplink audio signal generating device is decreased, thus ensuring that the uplink audio signal may be sent to the second pin, namely the microphone pin MIC. In this way, the uplink transmission of the audio signal may be implemented.

Therefore, no matter which line sequence the first pin and the second pin of the audio interface have, the uplink transmission of the audio signal may be implemented via the attenuation circuit according to embodiments of the present disclosure.

Figure 7:
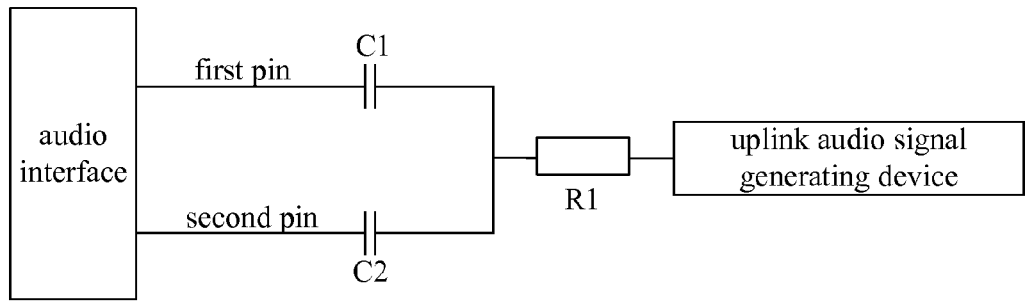
FIG. 7 is a second schematic view of the uplink transmission device for an audio signal via an audio interface according to a second embodiment of the present disclosure.

The attenuation circuit may be a filter circuit in FIG. 7. As shown in FIG. 7, the first pin of the audio interface is connected to the uplink audio signal generating device via a first capacitor C1 and a first resistor R1, and the second pin of the audio interface is connected to the uplink audio signal generating device via a second capacitor C2 and the first resistor R1.

When the first pin is the microphone pin MIC and the second pin is the ground pin GND, since the uplink audio signal sent by the uplink audio signal generating device is filtered by the first capacitor C1 and the first resistor R1, an amplitude of the uplink audio signal sent by the uplink audio signal generating device is decreased, thus ensuring that the uplink audio signal may be sent to the first pin, namely the microphone pin MIC. In this way, the uplink transmission of the audio signal may be implemented.

When the first pin is the ground pin GND and the second pin is the microphone pin MIC, since the uplink audio signal sent by the uplink audio signal generating device is filtered by the second capacitor C2 and the first resistor R1, an amplitude of the uplink audio signal sent by the uplink audio signal generating device is decreased, thus ensuring that the uplink audio signal may be sent to the second pin, namely the microphone pin MIC. In this way, the uplink transmission of the audio signal may be implemented.

Therefore, no matter which line sequence the first pin and the second pin of the audio interface have, the uplink transmission of the audio signal may be implemented by the attenuation circuit according to embodiments of the present disclosure.

The filter circuit according to embodiments of the present disclosure may be symmetric, in other words, resistances of the first resistor R1 and the second resistor R2 are the same, and capacitances of the first capacitor C1 and the second capacitor C2 are the same. The filter circuit according to embodiments of the present invention may be asymmetric, in other words, resistances of the first resistor R1 and the second resistor R2 are different from each other, and capacitances of the first capacitor C1 and the second capacitor C2 are different from each other.

Of course, similarly as Embodiment 1, it is required in the present embodiment that the audio interface and the uplink audio signal generating device form a loop to ensure the uplink audio signal generating device may send the uplink audio signal normally.

Of course, the filter circuit according to embodiments of the present disclosure is not limited to a circuit comprising the resistor and the capacitor as described in the present embodiment. Any symmetric circuit or asymmetric circuit capable of reaching the aim of attenuation is within the scope of the present disclosure.

Embodiment 3

The difference between the present embodiment and the Embodiment includes the attenuation circuit includes a combination of a filter circuit and a voltage-dividing circuit.

Figure 8:
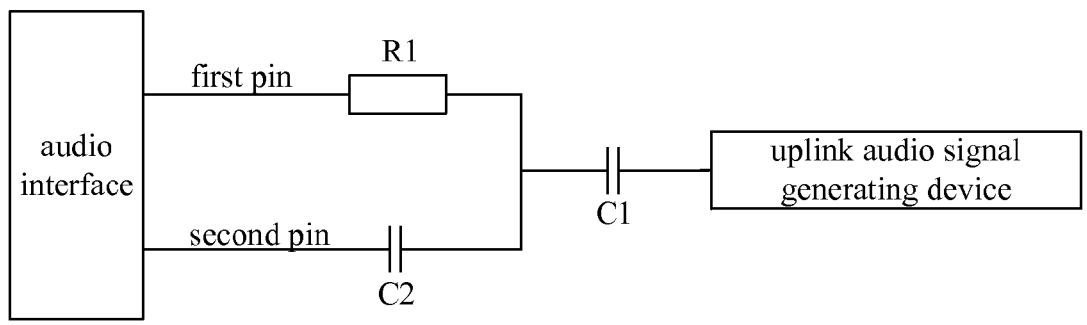
FIG. 8 is a first schematic view of an uplink transmission device for an audio signal via an audio interface according to a third embodiment of the present disclosure.

The attenuation circuit may include a combination of a filter circuit and a voltage-dividing circuit in FIG. 8. As shown in FIG. 8, the first pin of the audio interface is connected to the uplink audio signal generating device via a first resistor R1 and a first capacitor C1, and the second pin of the audio interface is connected to the uplink audio signal generating device via a second capacitor C2 and the first capacitor C1.

When the first pin is the microphone pin MIC and the second pin is the ground pin GND, since the uplink audio signal sent by the uplink audio signal generating device is filtered by the first resistor R1 and the first capacitor C1, an amplitude of the uplink audio signal sent by the uplink audio signal generating device is decreased, thus ensuring that the uplink audio signal may be sent to the first pin, namely the microphone pin MIC. In this way, the uplink transmission of the audio signal may be implemented.

When the first pin is the ground pin GND and the second pin is the microphone pin MIC, since a voltage of an uplink audio signal sent by the uplink audio signal generating device is divided by the second capacitor C2 and the first capacitor C1, an amplitude of the uplink audio signal sent by the uplink audio signal generating device is decreased, thus ensuring that the uplink audio signal can be sent to the second pin, namely the microphone pin MIC. In this way, the uplink transmission of the audio signal may be implemented.

Therefore, no matter which line sequence the first pin and the second pin of the audio interface have, the uplink transmission of the audio signal may be implemented by the attenuation circuit according to embodiments of the present disclosure.

Of course, in some embodiments, the first pin of the audio interface may be connected to the uplink audio signal generating device via the second capacitor C2 and the first capacitor C1, and the second pin of the audio interface may be connected to the uplink audio signal generating device via the first resistor R1 and the first capacitor C1.

Figure 9:
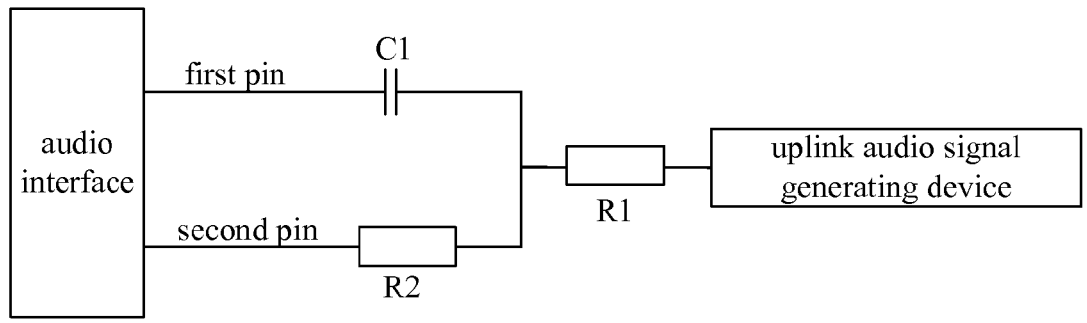
FIG. 9 is a second schematic view of the uplink transmission device for an audio signal via an audio interface according to a third embodiment of the present disclosure.

The attenuation circuit may include a combination of a filter circuit and a voltage-dividing circuit in FIG. 9. As shown in FIG. 9, the first pin of the audio interface is connected to the uplink audio signal generating device via a first capacitor C1 and a first resistor R1, and the second pin of the audio interface is connected to the uplink audio signal generating device via a second resistor R2 and the first resistor R1.

When the first pin is the microphone pin MIC and the second pin is the ground pin GND, since the uplink audio signal sent by the uplink audio signal generating device is filtered by the first capacitor C1 and the first resistor R1, an amplitude of the uplink audio signal sent by the uplink audio signal generating device is decreased, thus ensuring that the uplink audio signal may be sent to the first pin, namely the microphone pin MIC. In this way, the uplink transmission of the audio signal may be implemented.

When the first pin is the ground pin GND and the second pin is the microphone pin MIC, since a voltage of an uplink audio signal sent by the uplink audio signal generating device is divided by the second resistor R2 and the first resistor R1, an amplitude of the uplink audio signal sent by the uplink audio signal generating device is decreased, thus ensuring that the uplink audio signal may be sent to the second pin, namely the microphone pin MIC. In this way, the uplink transmission of the audio signal may be implemented.

Therefore, no matter which line sequence the first pin and the second pin of the audio interface have, the uplink transmission of the audio signal may be implemented via the attenuation circuit according to embodiments of the present disclosure.

Of course, in some embodiments, the first pin of the audio interface may be connected to the uplink audio signal generating device via the second resistor R2 and the first resistor R1, and the second pin of the audio interface may be connected to the uplink audio signal generating device via the first capacitor C1 and the first resistor R1.

The filter circuit according to embodiments of the present disclosure may be symmetric, in other words, the first resistor R1 and the second capacitor C2 have an equivalent reactance, and the first capacitor C1 and the second resistor R2 have an equivalent reactance. The filter circuit according to embodiments of the present invention may be asymmetric, in other words, the first resistor R1 and the second capacitor C2 have nonequivalent reactances, and the first capacitor C1 and the second resistor R2 have nonequivalent reactances.

Of course, similarly as Embodiment 1, it is required in the present embodiment that the audio interface and the uplink audio signal generating device form a loop to ensure the uplink audio signal generating device may send the uplink audio signal normally.

Of course, the filter circuit and the voltage-dividing circuit according to embodiments of the present disclosure are not limited to circuits comprising the resistor and the capacitor as described in the present embodiment. Any symmetric circuit or asymmetric circuit capable of reaching the aim of attenuation is within the scope of the present disclosure.

Embodiment 4

The present embodiment provides an uplink transmission method for an audio signal via an audio interface. The method comprises:

connecting a first pin of the audio interface to an uplink audio signal generating device via a first circuit; and connecting a second pin of the audio interface to the uplink audio signal generating device via a second circuit, where the first circuit and the second circuit are attenuation circuits for each other.

By connecting the first pin and the second pin of the audio interface to the uplink audio signal generating device in a mutual attenuation manner, an amplitude of the uplink audio signal sent by the uplink audio signal generating device is decreased, such that the first pin and the second pin of the audio interface are both allowed to receive the uplink audio signal, thus allowing the uplink audio signal to be transmitted in a case that a line sequence of the first pin and the second pin of the audio interface is unknown.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An uplink transmission device for an audio signal via an audio interface, wherein
   a first pin of the audio interface is connected to a signal output terminal of an uplink audio signal generating device via a first circuit;
   a second pin of the audio interface is connected to the signal output terminal of the uplink audio signal generating device via a second circuit, wherein:
   the first pin of the audio interface is one of a microphone pin and a ground pin;
   the second pin of the audio interface is the other one of the microphone pin and the ground pin; and
   the first circuit and the second circuit are attenuation circuits for each other.

2. The device according to claim 1, wherein:
   the first circuit is a filter circuit or a voltage-dividing circuit; and
   the second circuit is a filter circuit or a voltage-dividing circuit.

3. The device according to claim 2, wherein the first circuit and the second circuit are symmetric attenuation circuits for each other.

4. The device according to claim 2, wherein the first circuit and the second circuit are asymmetric attenuation circuits for each other.

5. An uplink transmission method for an audio signal via an audio interface, comprising:
   connecting a first pin and a second pin of the audio interface to a signal output terminal of an uplink audio signal generating device
   in a mutual attenuation manner, wherein:
   the first pin of the audio interface is one of a microphone pin and a ground pin;
   the second pin of the audio interface is the other one of the microphone pin and the ground pin; and
   connecting a first pin and a second pin of the audio interface to a signal output terminal of an uplink audio signal generating device in a mutual attenuation manner comprises: connecting the first pin of the audio interface to the signal output terminal of the uplink audio signal generating device via a first circuit; and connecting the second pin of the audio interface to the signal output terminal of the uplink audio signal generating device via a second circuit.

6. The method according to claim 5, wherein:
   the first circuit is a filter circuit or a voltage-dividing circuit; and
   the second circuit is a filter circuit or a voltage-dividing circuit.

7. The method according to claim 6, wherein the first circuit and the second circuit are symmetric attenuation circuits for each other.

8. The method according to claim 6, wherein the first circuit and the second circuit are asymmetric attenuation circuits for each other.

* * * * *